(12) United States Patent
Rockenfeller et al.

(10) Patent No.: US 9,172,249 B2
(45) Date of Patent: Oct. 27, 2015

(54) INTELLIGENT MICROGRID CONTROLLER

(75) Inventors: Uwe Rockenfeller, Boulder City, NV (US); Kaveh Khalili, Boulder City, NV (US)

(73) Assignee: ROCKY RESEARCH, Boulder City, NV (US)

( * ) Notice: Subject to any disclaimer, the term of this patent is extended or adjusted under 35 U.S.C. 154(b) by 950 days.

(21) Appl. No.: 13/208,834

(22) Filed: Aug. 12, 2011

(65) Prior Publication Data

US 2013/0041516 A1 Feb. 14, 2013

(51) Int. Cl.
*H02J 3/38* (2006.01)
*H02J 7/34* (2006.01)

(52) U.S. Cl.
CPC . *H02J 3/38* (2013.01); *H02J 3/383* (2013.01); *H02J 3/386* (2013.01); *H02J 3/387* (2013.01); *H02J 7/34* (2013.01); *Y02E 10/563* (2013.01); *Y02E 10/763* (2013.01)

(58) Field of Classification Search
None
See application file for complete search history.

(56) References Cited

U.S. PATENT DOCUMENTS

| | | | | |
|---|---|---|---|---|
| 5,734,255 | A * | 3/1998 | Thompson et al. | 322/7 |
| 5,929,538 | A * | 7/1999 | O'Sullivan et al. | 307/66 |
| 2005/0035664 | A1* | 2/2005 | Zver et al. | 307/115 |
| 2009/0185346 | A1* | 7/2009 | Cairo et al. | 361/692 |
| 2009/0195074 | A1* | 8/2009 | Buiel | 307/48 |
| 2010/0274407 | A1* | 10/2010 | Creed | 700/295 |
| 2012/0306458 | A1* | 12/2012 | Fogarty et al. | 322/32 |

OTHER PUBLICATIONS

Mark McGranaghan, et al., Functions of a Local Controller to Coordinate Distributed Resources in a Smart Grid, IEEE PES Panel, Electric Power Research Institute, Jul. 22, 2008, pp. 17.
Michael Krok, Microgrid Design, Development and Demonstration, RDSI Peer Review, Electric Power & Propulsion Laboratory, GE Global Research, Oct. 30, 2008, pp. 24.
Nikos Hatziargyriou, et al., Microgrids, An Overview of Ongoing Reserach, Development, and Demonstration Projects, IEEE power & entergy magazine, Jul.-Aug. 2007, vol. 1540-7977, Issue 07, pp. 78-94.
Robert H. Lasseter et al., HICSS-34 Tutorial 14 mGrid Operation and Control, University of Wisconsin Board of Regents, Jan. 3, 2001, pp. 109.
J.A. Pecas Lopes, et al, Defining Control Strategies for Analysing MicroGrids Islanded Operation, Power Tech, 2005 IEEE Russia, pp. 1-7, Jun. 2005.

* cited by examiner

*Primary Examiner* — Sean Shechtman
*Assistant Examiner* — Steven Garland
(74) *Attorney, Agent, or Firm* — Knobbe, Martens, Olson & Bear LLP

(57) ABSTRACT

A microgrid controller may control the generation, distribution, storage and use of electrical power on a microgrid. Embodiments of a microgrid controller may include inputs for different types of power (e.g. AC and DC) or power sources (e.g. wind and solar), an input for utility grid power, electrical equipment for conditioning the electrical power received from the multiple sources (e.g. rectifiers and inverters), outputs to multiple types of loads (e.g. three-phase AC and single-phase AC) and control circuitry designed to control the generation, storage, distribution and usage of electrical power on the microgrid. Embodiments of microgrid systems may include multiple types of electrical generation sources (e.g. wind, solar, electromechanical and fuel cell), multiple types of electrical loads (e.g. inductive and resistive), electrical storage units (e.g. batteries) and a microgrid controller.

19 Claims, 7 Drawing Sheets

INTELLIGENT MICROGRID CONTROLLER

FIELD OF THE INVENTION

Embodiments relate to a system and method for controlling power utilization on a microgrid. More particularly, embodiments relate to a system and method for increasing the efficiency of power production within a microgrid.

BACKGROUND OF THE INVENTION

A microgrid is a localized grouping of electrical generation, electrical energy storage, and electrical loads. Microgrids are often connected to a traditional utility grid and may operate as connected to the utility grid or completely independent from the utility grid. Microgrid electrical generation sources can include, for example, wind turbines, photovoltaic or "solar" panels, electromechanical generators, turbine generators, fuel cells, and other types of electrical generation machinery. By having local and diverse electrical generation sources and the ability to operate independent of a utility grid, microgrids may provide highly reliable and cost effective electric power to many types of installations, both urban and remote.

Because microgrids may use many different types of electrical generation sources, including renewable and non-renewable energy, and may include many different types of loads to service, efficient control of microgrid assets is challenging. For example, electrical generation sources such as diesel-powered generators often operate most efficiently at a fixed electrical output near their rated maximum output. However, the rated output of such a generator may exceed the present need for electrical power on the microgrid at any one time. Altering the output of the electromechanical generator such that it meets the current electrical load on the microgrid, i.e. operating it in a "load following" manner, may significantly reduce the efficiency of the generator, which leads to increased operational cost. Likewise, renewable resources such as wind and solar power provide unpredictable electrical output and may need to be supplemented with other power sources to provide sufficient power to manage peak load requirements on the microgrid. Thus, there is a need for apparatuses and methods to efficiently control microgrid assets, including generation, storage and load assets.

SUMMARY OF THE INVENTION

A microgrid controller may control the generation, distribution, delivery, storage and use of electrical power on a microgrid. Embodiments of a microgrid controller may include inputs for different types of power (e.g. AC and DC) or power sources (e.g. wind and solar), an input for utility grid power, electrical equipment for conditioning the electrical power received from the multiple sources (e.g. rectifiers and inverters), outputs to multiple types of loads (e.g. three-phase AC and single-phase AC) and control circuitry designed to control the generation, storage, distribution and usage of electrical power on the microgrid. Embodiments of microgrid systems may include multiple types of electrical generation sources (e.g. wind, solar, electromechanical and fuel cell), multiple types of electrical loads (e.g. inductive and resistive), electrical storage units (e.g. batteries) and a microgrid controller.

In one embodiment, a system for increasing efficiency of power generation, distribution and delivery, includes: a microgrid controller having a plurality of inputs and outputs; one or more power generation units electrically connected to a first input on the microgrid controller; an electrical storage unit electrically connected to a second input on the microgrid controller; and an electrical load electrically connected to an output of the microgrid controller, and wherein the microgrid controller comprises a control module connected to the one or more power generation units and configured to increase the overall efficiency of the one or more power generation unit.

In another embodiment, a microgrid controller, includes: a plurality of inputs configured to electrically connect to a plurality of power generation units; a plurality of outputs configured to electrically connect to a plurality of electrical loads; and a control module comprising instructions to control the plurality of power generation units and increase the overall energy output efficiency of the plurality of power generation units.

In a further embodiment, a method in a microgrid controller for allocating power to electric loads connected to a microgrid, the method includes: receiving grid load data from at least one load electrically connected to the microgrid controller; receiving electric generation data from at least one power generation unit electrically connected to the microgrid controller; calculating generator efficiency data for the at least one power generation unit electrically connected to the microgrid controller; and sending generator control data to the at least one power generation unit electrically connected to the microgrid controller to increase the output power generation of the at least one power generation unit.

DETAILED DESCRIPTION

Figure 1:
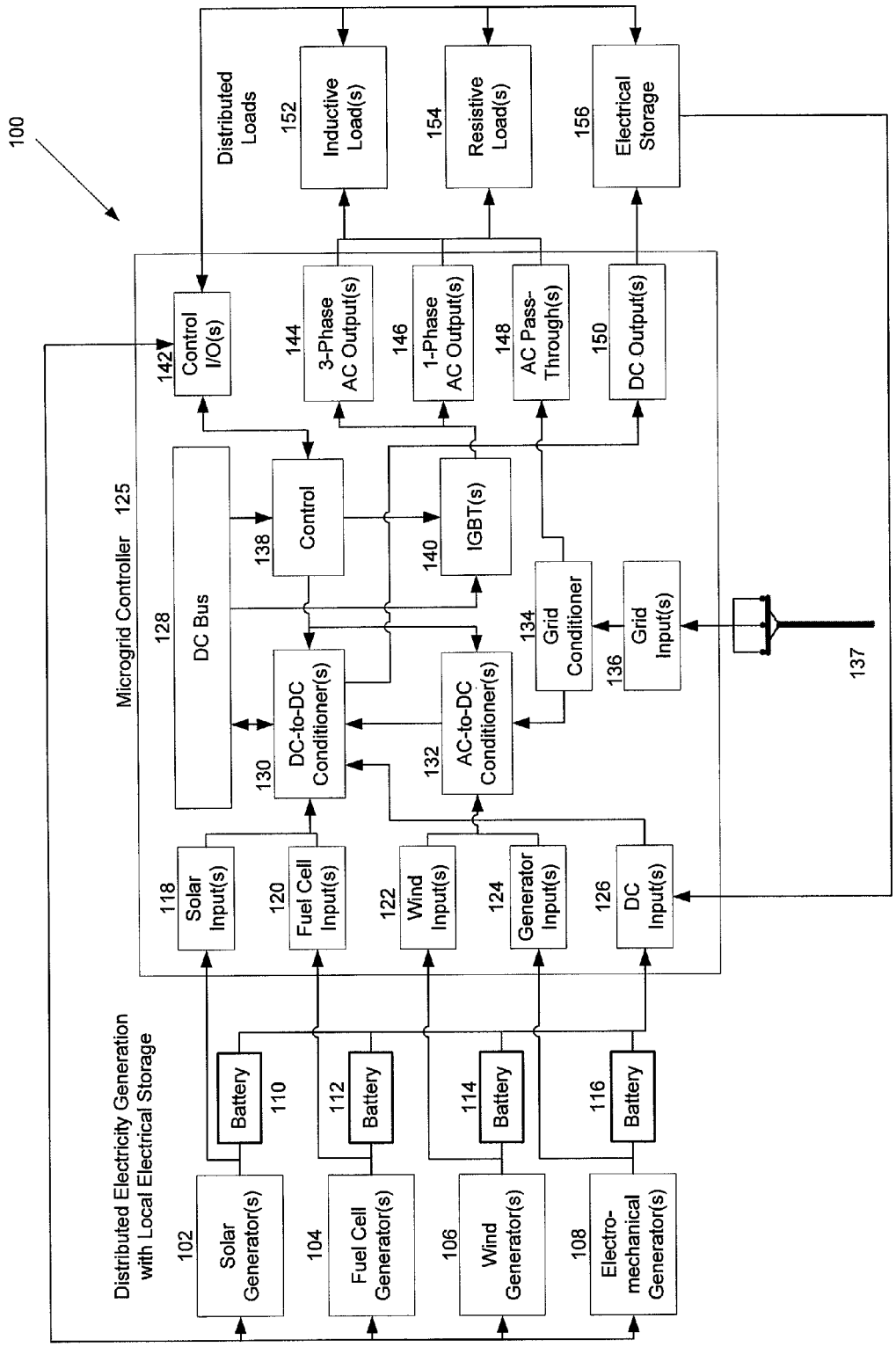
FIG. 1 is a schematic block diagram illustrating one embodiment of a microgrid with a plurality of electrical generation units, a microgrid controller, and a plurality of electrical loads.

Embodiments relate to microgrid controllers that are used to intelligently control power generation and usage on a microgrid. Embodiments of microgrid systems may include multiple types of electrical generation sources electrically connected to a microgrid controller. As described in more detail with reference to FIG. 1, below, electrical generation sources may include solar generators, wind generators, fuel cell generators, electromechanical generators, and other types of power generation machinery.

One embodiment relates to a microgrid controller that increases the efficiency of electromechanical generators providing microgrid power. Electromechanical generators that use fuel-burning engines tend to be most efficient at a particular engine speed based on the generator's design and particular electrical output level. For example, some generators may output 10 kilowatts per hour at 4000 revolutions per minute (RPM) and use 1 gallon of fuel per hour, which corresponds to an efficiency of 10 kWh/gallon. This is sometimes referred to as the generator's "rated load" or "rated output capacity." Unfortunately, many generators are often substantially less efficient when operating at slower engine speeds and correspondingly lower electrical outputs, i.e. partial loads. It is not unusual for an electromechanical generator such as a diesel generator to be as much as 40% less efficient when operating at partial loads. Thus, the same generator may produce 5 kilowatts per hour at 2000 RPM and use 0.7 gallons an hour, which corresponds to an efficiency of 7.14 kWh/gallon. Likewise, a generator may be less efficient when operated at higher than optimal engine speeds. For example, the same generator may produce 12 kilowatts per hour at 5000 RPM and use 1.5 gallons per hour, which corresponds to an efficiency of 8 kWh/gallon. Thus, it is most fuel efficient, and correspondingly most cost efficient, to run an electromechanical generator at a rate where the most electricity will be produced using the least amount of fuel. By design, this is typically a rate which generates at or near the rated output capacity of the generator; however the generator may have an optimal efficiency range i.e. a range of RPMs where it is most efficient in terms of fuel used per watt of electricity produced For example, a generator may have an operating range of 0-4000 RPM, but have an optimal efficiency range of 3000-3200 RPM. Accordingly, one embodiment is a microgrid controller that controls the performance of an electromechanical generator so that it runs with the highest available efficiently in order to supply enough power for a given load on the microgrid.

Embodiments of microgrid controllers allow electrical generators linked to the controller to run at or near their rated capacity regardless of varying electrical loads on the microgrid. In one embodiment, the microgrid controller maintains a steady electrical load on the microgrid by storing electrical power in electrical storage units during times of reduced load. Similarly, the microgrid controller may add power to the microgrid during times of peak power usage to reduce the overall load on the connected electrical generators. Thus, a microgrid controller may improve overall generator efficiency by allowing electrical generators to operate at or near their optimum efficiency for extended periods of time.

Embodiments of microgrid systems may also include multiple types of electrical loads, such as inductive (e.g. electric motors) and resistive (e.g. lighting). For example, a microgrid may include electrical connections to one or more Environmental Control Units (ECUs). ECUs are systems designed to provide environmental control, such as heating, ventilation, air conditioning, and refrigeration (HVAC&R) to enclosures. An enclosure may be residential in nature, such as a house, apartment, livable trailer, mobile home or other as are well known. An enclosure may also be commercial in nature, such as a building, office, factory, store, warehouse, and others as are well known. Finally, an enclosure may be remote, such as a tent, shelter, bunker or others as are well known. ECUs are often mounted on a vehicle or trailer so that they may be placed in a remote location, such as a forward operating base, and provide HVAC&R to remote enclosures such as tents for personnel and equipment. Embodiments of ECUs may include one or more AC motors, such as single-phase and three-phase motors, phase change modules, a condenser coil, an evaporator coil, refrigerant lines, fans, a pulsed control valve and air handling ducting.

However, heating, ventilation, air conditioning, and refrigeration needs change constantly based on ambient and other conditions. These changing conditions can dramatically vary the electric load requirements of an ECU over time. For example, while an enclosure may need constant cooling during the daytime hours, it may only need intermittent cooling during nighttime hours. When an ECU only provides intermittent cooling, its power consumption needs change quickly in a short time period. This cycling is inefficient from a power consumption standpoint because coupled power generators, such as diesel generators, are most efficient when producing a constant amount of power, usually near their maximum capacity. This rapidly changing power consumption can lead to inefficient usage of a generator because the generator needs to be continually changing power output to meet the load demands of the ECU. However, the microgrid controller described herein, in one embodiment, senses the varying electric loads connected to the microgrid and adjusts the input electrical power generation capacity, as well as stored electrical capacity, to increase the generator efficiency on the microgrid.

The efficiency of HVAC&R systems, such as those found in ECUs, may be increased by utilizing insulated gate bipolar transistors (IGBTs) or Variable Frequency Drives (VFDs) to control specific HVAC&R components, such as three-phase and single-phase AC motors. IGBTs and VFDs are capable of driving HVAC&R components, such as electrical motors, efficiently at multiple speeds by altering the frequency of the electricity provided to the HVAC&R components, as is well known in the art. Because an HVAC&R unit may have several different components with unique individual power requirements, it is often advantageous to provide more than one IGBTs or VFDs in, or connected to, an HVAC&R unit. Multiple IGBTs or VFDs allow particular components of an HVAC&R unit to be controlled more precisely according to their distinct operating parameters. For example, while a fan and a compressor motor may require similar types of power, such as three-phase AC power, each may require very different voltages and wattages to operate properly. A microgrid controller may increase the efficiency of a microgrid as a whole by controlling connected HVAC&R systems, such as those found in ECUs. For example, a microgrid controller can manage the output of connected power generation units to meet the electrical demand of connected HVAC&R system while managing the electric load on the grid as a whole.

Embodiments of microgrid systems may also include electrical storage units. Electrical storage units store electricity for later use as discussed above. Embodiments of electrical storage units include batteries such as rechargeable DC batteries. The electrical capacity of electrical storage units including batteries may be increased by using different kinds of batteries (e.g. Nickel Metal Hydride, Lead Acid, and Lithium Ion), more batteries, or larger batteries. An electrical storage unit may be used to store excess power generated by power generation units connected to microgrid, or may be used to supplement the power available to loads connected to a microgrid. A microgrid controller may increase the efficiency of the microgrid as a whole by using electrical storage units to store excess electrical generation, or to supplement insufficient electrical generation on the microgrid, rather than altering the speed of the generators connected to the microgrid.

Inputs to the microgrid can include a plurality of different power generation types. For example, the output of solar and wind generators is often driven by environmental variables, such as the amount of direct sunlight available and the amount of wind (respectively), and therefore such generators may have varying electrical output capacity. Because it is not desirable to reduce the electrical output of solar and wind generators, and indeed often impractical, even when the electric load of a microgrid system is lower than the instant output capacity of the connected power sources. Accordingly, in one embodiment, solar and wind generators may be electrically connected to an electrical storage unit such as a battery so that excess generated electricity is stored for later use.

FIG. 1 is a schematic block diagram illustrating a microgrid system 100 with a microgrid controller 125. The microgrid system 100 includes a plurality of power generation units that supply the input power to the microgrid. Solar generator 102 may include photovoltaic panels. Embodiments of microgrid system 100 may include one or more solar generators. Solar generators typically output DC power at a variety of voltages, such as, for example, 500 volts. However, as discussed above, the output of a solar generator can vary with ambient conditions, such as the amount of sunlight the generator is exposed to. In some embodiments the solar generator may be connected to a local inverter, which converts its DC output to AC output, or the solar generator may have an integral inverter to accomplish the same. Solar generators that are connected to an inverter may output single phase or multiphase AC power at a variety of voltages such as, for example, 240 volts. Solar generators may have power output capacities, typically measured in watts, that vary based on the size of the system (e.g. the number of panels), the type of the system (e.g. thin-film), the ambient conditions (e.g. direct versus indirect light) and others. Solar generators may be portable (e.g. attached to a trailer) or may be permanently installed in the ground or permanently affixed to an object such as an enclosure. Embodiments of solar generators may have sensors which report current electrical output of the unit, power output capacity (i.e. total power output potential) and other operating parameters. Additionally, solar generators may have communication circuitry to receive control signals (e.g. to turn off the unit, change the angle of the unit or to store power to the unit's local battery) from electrically connected control units and to send status data to the same.

As shown in FIG. 1, solar generator 102 is electrically connected to solar input 118 of microgrid controller 125 as well as to battery 110. Battery 110 provides local power storage for solar generator 102 so that fluctuations in load may be mitigated by storing excess generated power from solar generator 102 to battery 110. For example, if microgrid controller 125 signals to the solar generator 102 that there is a reduced need for electrical power required to service the connected loads 152-154, then battery 110 may be used to store additional energy produced during the time of reduced load. Note that battery 110 may be a single battery or a plurality of batteries as dictated by the specification of solar generator 102.

Fuel cell generator 104 may be an electrochemical cell that converts chemical energy from a fuel source into electric energy. Examples of fuel cell generators include hydrogen fuel cells, which uses hydrogen as a fuel and oxygen as an oxidant. Other fuels may be used, including hydrocarbons and alcohols, and other oxidants may be used, including, for example, chlorine and chlorine dioxide. Embodiments of microgrid system 100 may include one or more fuel-cell generators. Fuel cell generators typically output DC power at a variety of voltages, such as 200 volts. In some embodiments a fuel cell generator may be connected to an inverter, which converts its DC output to AC, or may have an integral inverter to accomplish the same. Fuel cell generators that are connected to an inverter may output single phase or multi-phase AC power at a variety of voltages. Embodiments of fuel cell generators may have sensors which report current electrical output of the unit, power output capacity and other parameters. Additionally, fuel cell generators may have communication circuitry to receive control signals (e.g. to turn on or off the unit, or to store power to the unit's local battery) from electrically connected control units. As shown, fuel cell generator 104 is electrically connected to fuel cell input 120 of microgrid controller 125 as well as battery 112. Battery 112 provides local power storage for fuel cell generator 104 so that fluctuations in load may be mitigated by storing excess generated power from fuel cell generator 104 to battery 112. Note that battery 112 may be a single battery or a plurality of batteries as dictated by the specification of fuel cell generator 104.

Wind generator 106 may be a wind turbine. A wind turbine is an electromechanical system that may use a plurality of blades to convert wind energy into energy that drives a generator. In some embodiments the wind turbine uses a plurality of axially mounted blades, while in other embodiments the wind turbine may use a plurality of vertically mounted blades rotating around a central axis. Wind turbines may be portable (e.g. attached to a trailer) or may be permanently installed in the ground or permanently affixed to an object, such as an enclosure. Embodiments of microgrid system 100 may include one or more wind generators. Wind generators may output single-phase or multi-phase AC power at a variety of voltages, such as 420 volts. In certain embodiments, the output of a wind generator may be rectified so that it outputs DC power. The output of wind generators is often driven by environmental variables, such as, for example, the speed and direction of the wind, and therefore wind generators may have varying electrical output capacity. Embodiments of wind generators may have sensors which report, for example, speed of the system, current electrical output of the unit, power output capacity and other parameters. Additionally, wind generators may have communication circuitry to receive control signals (e.g. to turn on or off the unit, to change the direction of the unit or pitch of the blades, or to store power to the unit's local battery) from electrically connected control units. Wind generator 106 is electrically connected to wind input 122 of microgrid controller 125 as well as to battery 114. Battery 114 provides local power storage for wind generator 106 so that fluctuations in load may be mitigated by storing excess generated power from wind generator 106 to battery 114. For example, if microgrid controller 125 suddenly decreases the electrical power required to service the connected loads 152-154, then battery 114 may be used to store additional energy produced during the time of decreased load. Note that battery 114 may be a single battery or a plurality of batteries as dictated by the specification of wind generator 106.

Electromechanical generator 108 may be a fuel-burning reciprocating engine generator such as a diesel generator. Embodiments of the microgrid system 100 may include one or more electromechanical generators. Diesel generators may output single-phase or multi-phase AC power at a variety of voltages and wattages. For example, a portable diesel generator may have a three-phase AC, 460 volt output with a maximum rated output of 10 kilowatts. Other generators may be capable of outputting single-phase and multi-phase current simultaneously and at different voltages. Some generators may output AC as well as DC power using built-in inverters. Often, an electromechanical generator such as a diesel generator will include a built in inverter so that DC power from an attached battery, or another source, may be used to start the AC generator.

The output of the electromechanical generator 108 is typically controlled by the speed at which the generator is run. The speed may be set manually, or may be set via control signals received at the generator. Embodiments of electromechanical generators may have sensors which report speed of the system (e.g. RPM), current electrical output of the unit, power output capacity and other parameters to the microgrid controller 125. Additionally, the electromechanical generator 108 may have communication circuitry to receive control signals from the microgrid controller 125. Electromechanical generator 108 is electrically connected to generator input 124 of microgrid controller 125 as well as to battery 116. Battery 116 provides local power storage for electromechanical generator 108 so that fluctuations in load may be mitigated by storing excess generated power from electromechanical generator 108 to battery 116. For example, if microgrid controller 125 suddenly decreases the electrical power required to service the connected loads 152-154, then battery 116 may be used to store additional energy produced during the time of decreased load. Note that battery 116 may be a single battery or a plurality of batteries as dictated by the specification of electromechanical generator 108.

In other embodiments, microgrid system 100 may include inputs from additional types of power generation units, including: micro-turbine, micro-nuclear, hydroelectric, and other types.

In the embodiment of FIG. 1, microgrid controller 125 includes a plurality of power generation inputs. Solar input 118 is a connection point at which an electrical connection from solar generator 102 is connected to microgrid controller 125. This connection may be "hardwired" or may be easily disconnectable, such as the case when using commercially available electrical connection equipment as is known in the art. Solar input 118 may be a single input that connects one or more solar generators to microgrid controller 125, or it may be a plurality of inputs, each connectable to one or more solar generators.

Fuel-cell input 120 is a connection point at which an electrical connection from fuel-cell generator 104 is connected to microgrid controller 125. This connection may be hardwired or may be easily disconnectable, such as the case when using commercially available electrical connection equipment as is known in the art. Fuel-cell input 120 may be a single input that connects one or more solar generators to microgrid controller 125, or it may be a plurality of inputs, each connectable to one or more fuel-cell generators.

Wind input 122 is a connection point at which an electrical connection from wind generator 106 is connected to microgrid controller 125. This connection may be hardwired or may be easily disconnectable, such as the case when using commercially available electrical connection equipment as is known in the art. Wind input 122 may be a single input that connects one or more wind generators to microgrid controller 125, or it may be a plurality of inputs, each connectable to one or more wind generators.

Generator input 118 is a connection point at which an electrical connection from electromechanical generator 108 is connected to microgrid controller 125. This connection may be hardwired or may be easily disconnectable, such as the case when using commercially available electrical connection equipment as is known in the art. Generator input 124 may be a single input that connects one or more electromechanical generators to microgrid controller 125, or it may be a plurality of inputs, each connectable to one or more electromechanical generators.

DC input 126 is a connection point at which an electrical connection from the batteries 110, 112, 114 and 116 and the electrical storage unit 156 are connected to microgrid controller 125. This connection may be hardwired or may be easily disconnectable, such as the case when using commercially available electrical connection equipment as is known in the art. DC input 126 may be a single input that connects one or more electrical storage units to microgrid controller 125, or it may be a plurality of inputs, each connectable to one or more electrical storage units.

Microgrid controller 125 includes DC power bus 128. DC power bus 128 may be a multi-conductor loom with physical connectors so that the bus may be connected to components and expanded to meet the needs of microgrid controller 125. Certain embodiments of a DC power bus may comprise sub-buses that are at different voltages, such as a high-voltage DC sub-bus and a low-voltage DC sub-bus. In this way, a single DC power bus can provide DC power at different voltage levels in accordance with the needs of the components connected to the DC power bus. Further, different sub-buses may be provided to accommodate power and signaling separately.

Connected to the DC power bus 128 is a DC-to-DC conditioner 130. The DC-to-DC conditioner 130 takes as an input one or more DC power signals and outputs one or more DC power signals to DC power bus 128. In the embodiment illustrated in FIG. 1, the DC-to-DC conditioner 130 is electrically connected to the DC power bus 128 as well as DC solar input 118, fuel cell input 120, DC input 126 and AC-to-DC conditioner 132. In some embodiments, the output of the DC-to-DC conditioner 130 may be in the range of 200-600 volts DC. In one embodiment, DC-to-DC conditioner utilizes one or more DC-to-AC inverters and one or more AC-to-DC rectifiers to convert DC inputs of varying voltage to one or more output voltages as needed by DC bus 128. For example, where the DC bus 128 is a single voltage bus, the DC-to-DC conditioner 130 may receive power signals of different voltages from the solar input 118, the fuel cell input 120, the DC input 126 and the AC-to-DC conditioner 132 and output a single 500 volt DC signal. In other embodiments, where the DC bus 128 includes sub-busses at different voltages, the DC-to-DC conditioner 130 may output more than one voltage, such as 400 volt DC and 48 volt DC. In some embodiments, the microgrid controller 125 includes a separate DC-to-DC conditioner for each DC power signal. Further, in some embodiments, the DC-to-DC conditioner 130 may take DC power from DC the bus 128 as an input and output DC voltage at a different voltage. For example, the DC-to-DC conditioner 130 may receive 300 volt DC power from the DC bus 128, step the voltage down to, for example, 30 volts DC, and connect the reduced voltage to an electrical storage unit through DC output 150 for the purpose of charging the electrical storage unit at an appropriate voltage. Thus, in some embodiments, DC-to-DC conditioner may be bidirectional; that is: DC-to-DC conditioner may provide conditioned power to DC bus 128 as well as take power from DC bus 128 to be conditioned for other uses. DC-to-DC conditioner embodiments are described in more detail with respect to FIGS. 3 and 4, below.

Connected to the DC-to DC conditioner 130 is an AC-to-DC conditioner 132 that inputs AC power signals and outputs one or more DC power signals to the DC-to-DC conditioner 130. In other embodiments, the AC-to-DC conditioner 132 may be directly connected to the DC bus 128. The AC-to-DC conditioner 132 may include one or more rectifiers that receive AC power as an input and output DC power. For example, the AC-to-DC conditioner 132 may take 110 volt AC and output 30 volt DC power. The AC-to-DC conditioner 132 may receive power signals from AC power sources, such as: wind input 122, generator input 124 and a grid conditioner 134. In some embodiments, the AC-to-DC conditioner 132 includes a separate rectifier for each type of AC power input connected thereto. In other embodiments, the microgrid controller 125 includes a separate AC-to-DC conditioner for each AC input. An AC-to-DC conditioner embodiment with integral transformer is described in more detail with respect to FIG. 2, below.

Connected to the AC-to DC conditioner 132 is the grid conditioner 134 which receives power input from a grid input 136. The grid input 136 receives one or more AC power signals from "grid" or "utility" AC power mains i.e. AC power provided by an entity external to microgrid system 100. In some embodiments, the grid input 136 receives 3-phase 240 volt AC power from an electric utility line 137. Because the power provided by electric utility line 137 may suffer voltage or phase fluctuations, the grid input 136 is electrically connected to the grid conditioner 134, which conditions the received AC power signal to, for example, dampen and correct any voltage or phase fluctuations and to provide a smooth sinusoidal power input. The output of grid conditioner 134 is conditioned AC power, which is then provided to AC-to-DC conditioner 132. In some embodiments, grid input 136 and grid conditioner 134 are a single unit.

Also connected to the DC power bus 128 of the microgrid controller 125 is a control module 138, which controls the generation, distribution, storage and use of electrical power within microgrid system 100. The control module 138 is programmed to monitor the condition of devices electrically connected to the microgrid controller 125 and to send appropriate control signals to power input devices connected to microgrid controller 125. In the embodiment of FIG. 1, the control module 138 is electrically connected to a control input/output 142, through which electrical signal connections are made to the various power generation, and load consumption, components of the microgrid system. Note that in alternative embodiments the control module 138 may be integrated with other components of the system, or be electrically connected to the microgrid controller 125 by other means as are known in the art.

Because the control module 138 is electrically connected to DC bus 128 and receives operating power therefrom, the control module 138 may also sense the load on DC bus 128. Additionally the control module 138 may use the DC bus 128 for electrical signaling to other devices connected thereto.

The control module 138 is also electrically connected to inductive loads 152 and resistive loads 154 via the control input/output 142. Note that inductive loads 152 may be one or more inductive loads, such as 1-phase or 3-phase motors commonly used in HVAC equipment. Resistive loads 154 may be one or more resistive loads, such as lighting, computer or other electrical equipment. The control module 138 may be programmed or configured to actively sense the load created by inductive loads 152 and resistive loads 154 by methods well known in the art, or may receive load data from loads augmented with load sensors, such as smart appliances. Control module 138 may also send control signals to inductive loads, such as motors, to speed up or slow down, or to turn off altogether. Likewise, control module 138 may send control signals to certain resistive loads to turn on or off. In this way, control module 138 may divide electrical loads into categories such as critical and non-critical, and switch on or off various loads based on the condition of the microgrid as a whole. For example, if the microgrid were to lose a power generation source and have insufficient electrical power to service the connected loads, control module 138 can be configured to send control signals to shut off non-critical loads (e.g. lights) while keeping on critical loads (e.g. HVAC and computers).

The control module 138 is also electrically connected to solar generator 102, fuel cell generator 104, wind generator 106 and electromechanical generator 108 via control input/output 142 and may send control signals to the generators to control their operation based on the sensed load and other parameters. For example, if control module 138 senses a sudden drop in load on the microgrid system 100, it may send an electrical instruction to any of the connected generators (e.g. 102-108) to lower its power output, or alternatively to store its current generation in an electrical storage unit. Control module 138 may also receive operating data from any of the connected generators (e.g. 102-108) regarding power output, running conditions, and other parameters.

The control module 138 is also electrically connected to electrical storage unit 156 via control input/output 142 and may send electrical control signals to the electrical storage unit to cause power to flow to it for storage or to flow from it for usage on the microgrid in order maintain power generation efficiency for the microgrid as a whole. Additionally, control module 138 may include power sensors configured to sense the amount of stored power capacity in electrical storage unit 156 by methods well known in the art. Alternatively, electrical storage unit 156 may be augmented with sensors which actively monitor the unit's condition and capacity and which share data with control unit 138 via connection to control input/out 142.

The control module 138 is also electrically connected to one or more insulated gate bipolar transistors (IGBTs) 140 and may send electrical control signals to the IGBTs to cause the IGBT to create AC power of different phases, voltages and frequencies. For example, control module 138 could instruct one IGBT to output three-phase AC at 240 volts and another IGBT to output single-phase AC at 120 volts. Typically a single IGBT will be used to output a single power type (e.g. three-phase AC) so multiple IGBTs may be used in a single microgrid controller. In alternative embodiments, the control module 138 is electrically connected to variable frequency drives instead of IGBTs, as shown in FIG. 1.

Control module 138 is also electrically connected to the DC-to-DC conditioner 130 and may send control signals to it to control, for example, its state (e.g. on or off) and, in some embodiments, its output voltage. The control module 138 may also be programmed or configured to sense the operating conditions of DC-to-DC conditioner 130 such as its input voltage and output voltage.

The control module 138 is also electrically connected to the AC-to-DC conditioner 132 and may send control signals to it to control, for example, its state (e.g. on or off). The control module 138 may also sense the operating conditions of AC-to-DC conditioner 132 such as its input voltage and output voltage.

The control module 138 may be any form of controller or processor and is preferably a digital processor, such as a general-purpose microprocessor or a digital signal processor (DSP), for example. The control module 138 may be readily programmable by software; hard-wired, such as an application specific integrated circuit (ASIC); or programmable under special circumstances, such as a programmable logic array (PLA) or field programmable gate array (FPGA), for example. Program memory for the control module 138 may be integrated within the control module, or may be an external memory (not shown), or both. The control module 138 may execute one or more programs or modules to perform the aforesaid functions. The control module 138 may contain or execute other programs, such as to send control commands, transfer data, to associate data from the various components together (preferably in a suitable data structure), to perform calculations using the data, to otherwise manipulate the data, and to present results to a user (e.g. through a graphical user interface) or another processor..

The microgrid controller 125 also includes a plurality of electrical power outputs. Three-phase AC output 144 is electrically connected to IGBT 140. Single-phase AC output 146 may electrically connect IGBT 140 to various single-phase electric loads. AC pass-through 148 may electrically connect the grid input 136 to various three-phase or single-phase electric loads. DC output 150 may electrically connect the DC-to-DC conditioner 130 to electrical storage units, such as unit 156 of FIG. 1. This connection allows, for example, microgrid controller 125 to send power to electrical storage unit 156 for storage. Each of these connections may be hardwired or may be connectable through various types of electrical connection equipment as is known in the art.

DC output 150 may be a single output that connects to one or more electrical storage units, or it may be a plurality of outputs, each connectable to one or more electrical storage units. In other embodiments, DC output 150 may connect to DC electric loads, such as DC motors.

Microgrid system 100 includes electrical storage unit 156, which may be, for example, a battery, or a plurality of batteries electrically connected to each other. If multiple batteries are used, they may be connected in series or in parallel to produce resultant voltages different from the voltage of the individual battery units. Typically, batteries, like those used for electrical storage unit 156, have relatively low inherent voltages, such as 12 volt or 24 volt. While it may be possible to increase the voltage by wiring the batteries in series, it may be preferable to have fewer batteries or a lower voltage electrical storage unit. Moreover, as the power capacity of electrical storage unit 156 decreases (i.e. as it is being discharged from use), the voltage of electrical storage unit 156 will drop as well. Accordingly, electrical storage unit 156 may be electrically connected to DC-to-DC conditioner 130 by way of DC input 126 to increase the output voltage above its inherent or current voltage. This allows a low voltage electrical storage unit to provide power to a high voltage DC bus, such as DC bus 128 of FIG. 1. In alternative embodiments, a plurality of batteries may be used to create an electrical storage unit of a voltage that matches the voltage of DC bus 128. In this way, there is no need to step up or down the voltage of the DC bus to charge the electrical storage unit. Rather a direct connection could be made between DC bus 128 and electrical storage unit 156. Embodiments of electrical storage units may be, for example, nickel-metal-hydride, lithium-ion, lead-acid or other battery types as are well known in the art. For example, electrical storage unit 156 may include one or more lead-acid batteries, such as automobile batteries.

Figure 2:
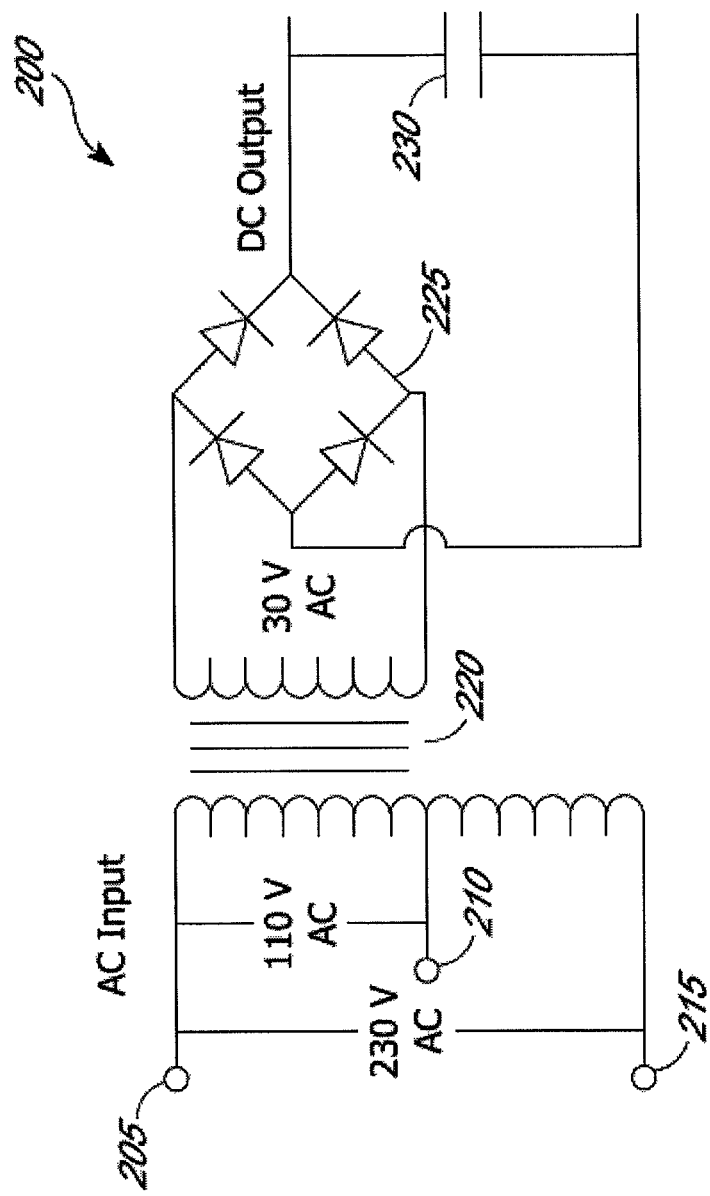
FIG. 2 is a schematic diagram illustrating an embodiment of an integrated rectifier.

FIG. 2 is a schematic diagram illustrating an embodiment of an integrated rectifier. Integrated rectifier 200 includes transformer 220, rectifier circuit 225, and filter 230. In the embodiment of FIG. 2, integrated rectifier 200 is capable of receiving both a 230 volt AC signal and a 110 volt AC signal, and is configured to produce a 30 volt DC output signal. Transformer 220 includes three taps 205, 210 and 215 on the input side. To produce a 110 volt AC signal, the top two taps, 205 and 210, are electrically connected to the transformer 220. Alternatively, to produce a 230 volt AC signal, the two outermost taps, 205 and 215, are electrically connected to transformer 220. Transformer 220 steps down the input voltage to produce a lowered output voltage for rectifier circuit 225. In this embodiment, rectifier circuit 225 is a four diode bridge rectifier. Other rectifier configurations may be used. Filter 230 then smoothes the DC output signal from rectifier circuit 225. As shown in FIG. 2, filter 230 is a single capacitor. In other embodiments, alternative filters may be used as are known in the art. A low voltage DC signal, such as that produced by integrated rectifier 200, may be used for charging an electrical storage unit (not shown). Integrated rectifier 200 may be used as an AC-to-DC conditioner. In other embodiments, several circuits, such as that shown in FIG. 2, may be combined to form an AC-to-DC conditioner capable of handling multiple AC power inputs of different nominal voltages.

Figure 3:
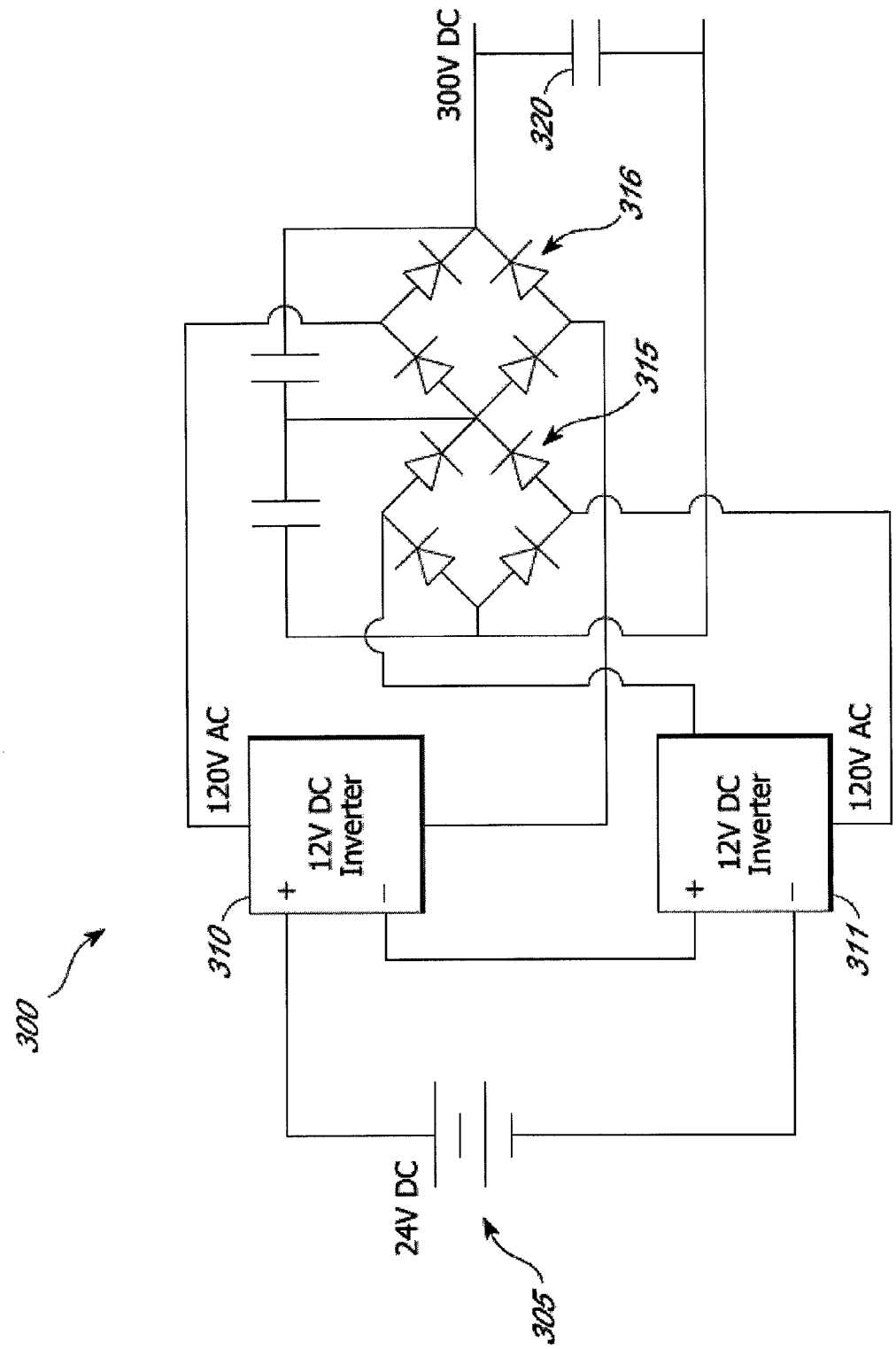
FIG. 3 is a schematic diagram illustrating an embodiment of a DC-to-DC conditioner.

FIG. 3 is a schematic diagram illustrating an embodiment of a DC-to-DC conditioner, such as DC-to-DC conditioner 130 of FIG. 1. DC-to-DC conditioner 300 includes two 12 volt DC to 120 volt AC inverters, 310 and 311, rectifiers 315 and 316, and filter 320. DC-to-DC conditioner 300 receives a 24 volt DC power signal from DC power source 305 and outputs 300 volt DC power. Inverters 310 and 311 are each configured to receive a 12 volt DC input signal and output a 120 volt AC signal. Rectifiers 315 and 316 rectify the respective AC input signals and produce DC output signals of about 150 volts each. Rectifiers 315 and 316 are connected in serial, and therefore collectively produce a combined DC signal of about 300 volts. In the embodiment shown in FIG. 3, rectifiers 315 and 316 are each four diode bridge rectifiers in parallel with a capacitor. Other rectifier configurations may be used. Additionally, filter 320 is connected across the rectifier outputs and improves the quality of the DC output signal. As shown in FIG. 3, filter 320 is a single capacitor. In other embodiments, alternative filters may be used as are known in the art. Several circuits, such as that shown in FIG. 3, may be combined to form a DC-to-DC conditioner capable of handling multiple DC power inputs of different voltages.

Figure 4A:
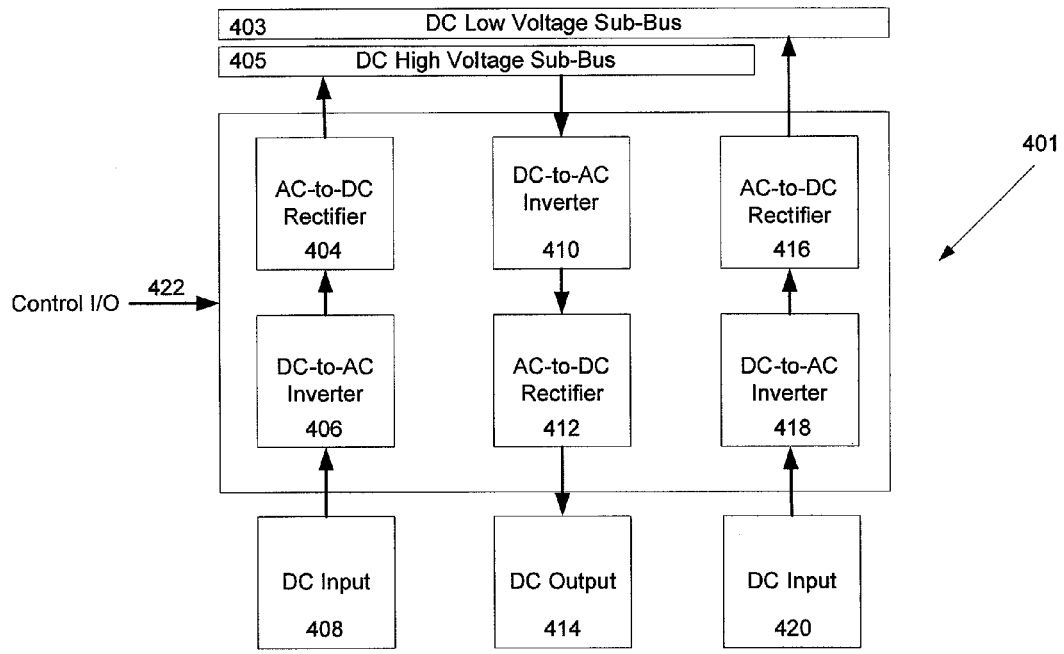
FIGS. 4A and 4B are schematic diagrams illustrating different embodiments of DC-to-DC conditioners that are capable of receiving multiple DC input signals and outputting multiple DC output signals.
Figure 4B:
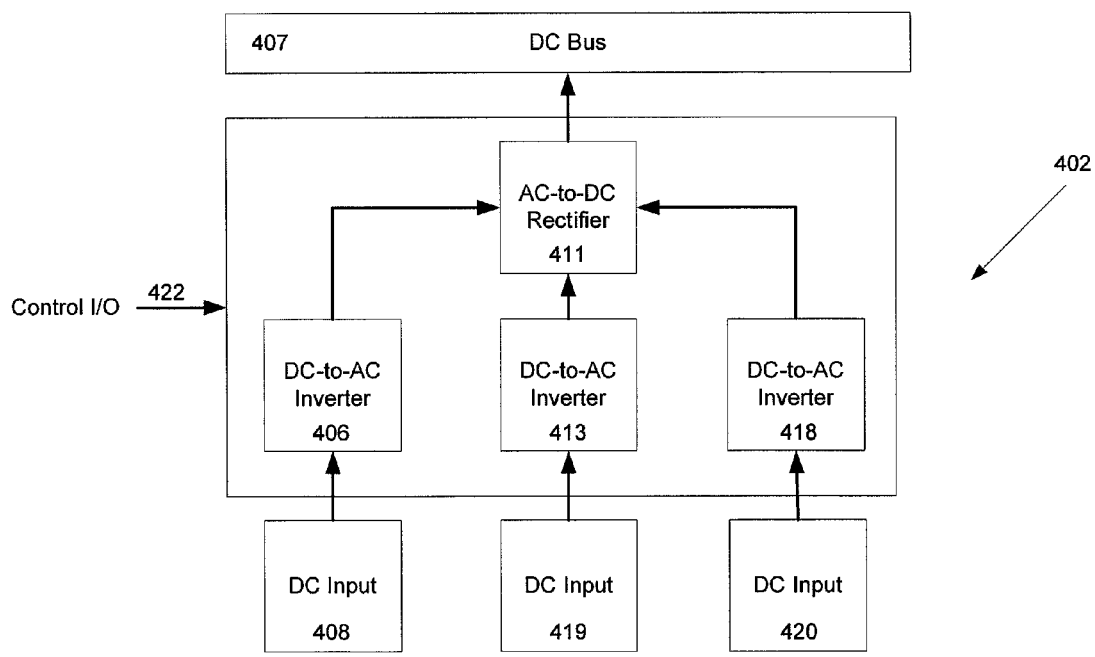

FIGS. 4A and 4B show different embodiments of DC-to-DC conditioners (401 and 402) that are capable of receiving multiple DC input signals and outputting multiple DC output signals, such as DC-to-DC conditioner 130 of FIG. 1. In FIG. 4A, DC-to-DC conditioner 401 is electrically connected to DC inputs 408 and 420, which are in-turn electrically connected to inverters 406 and 418, respectively. DC inputs 408 and 420 may be, for example, DC solar input 118 and fuel cell input 120 of FIG. 1.

Inverters 406 and 418 convert the DC input signal to AC output signals and may change the voltage in the process. Inverters 406 and 418 are electrically connected to rectifiers 404 and 416, respectively, which receive AC signals from the inverters and convert the signals back into DC output signals. Rectifiers 404 and 416 may again change the voltage of the signal during the conversion. Rectifier 404 is electrically connected to DC high voltage sub-bus 405, which may be, for example, a 300 volt DC sub-bus. Accordingly, in this embodiment, rectifier 404 is configured to output a 300 volt DC signals. Rectifier 416 is electrically connected to DC low voltage sub-bus 403, which may be, for example, a 30 volt DC sub-bus. Thus, rectifier 416 is configured to output a 30 volt DC signal.

In the embodiment of FIG. 4A, DC-to-DC conditioner 401 is bidirectional; that is: DC power flows to it from DC inputs (408 and 420) and from it to DC outputs (414). Accordingly, inverter 410 is electrically connected to DC high voltage sub-bus 405 and receives from it a high voltage DC signal. Inverter 410 converts the DC signal to an AC signal and may change the voltage in the process. Inverter 410 then passes the AC power signal to rectifier 412, which receives the AC signal and converts it back to a DC signal. In this embodiment, the output signal from rectifier 412 is a 24 volt DC signal which flows to DC output 414, and which may be used, for example, to charge an electrical storage unit such as a battery. Collectively, sub-busses 403 and 405 may make up a DC bus, such as DC bus 128 of FIG. 1. AC-to-DC rectifiers 404, 410 and 416 may be circuits such as that shown in FIG. 2.

In the embodiment of FIG. 4A, control input/output 422 allows control signals to be sent to DC-to-DC conditioner 401 such as, for example, to turn components on or off. In some embodiments, DC-to-DC conditioner 401 may respond to control signals from control input/output 422 and change the voltages provided to the sub-busses (403 and 405) and to DC output 414. Control input/output 422 also allows status signals, such as input and output voltages of DC-to-DC conditioner 401, to be sent to electrically connected modules, such as control module 148 of FIG. 1. Alternatively, control input/output 422 may allow electrically connected modules, such as control module 148 of FIG. 1, to sense the input and output voltages of DC-to-DC conditioner 401.

In FIG. 4B, DC-to-DC conditioner 402 is electrically connected to DC inputs 408, 419 and 420, which are in-turn electrically connected to DC-to-AC inverters 406, 413 and 418, respectively. DC inputs 408, 419 and 420 may be, for example, DC solar input 118, fuel cell input 120 and DC input 126 of FIG. 1. Inverters 406, 413 and 418 convert the DC input signals to an AC output signals and may change the voltage in the process. Inverters 406, 413 and 418 are electrically connected to AC-to-DC rectifier 411, which receives AC signals from the inverters and converts the signals back into a DC output signal. AC-to-DC rectifier 411 may again change the voltage of the signal during the conversion. AC-to-DC rectifier 411 is electrically connected to DC bus 407, which may be, for example, a 300 volt DC bus. DC-to-DC conditioner 402 includes control input/output 402, which may be, for example, electrically connected with control module 148 of FIG. 1. In the embodiment of FIG. 4B, control input/output 422 allows control signals to be sent to DC-to-DC conditioner 402 such as, for example, to turn components on or off. In some embodiments, DC-to-DC conditioner 402 may respond to control signals from control input/output 422 and change the voltages provided to DC bus 407. Control input/output 422 also allows status signals, such as input and output voltages of DC-to-DC conditioner 402, to be sent to electrically connected modules, such as control module 148 of FIG. 1. Alternatively, control input/output 422 may allow electrically connected modules, such as control module 148 of FIG. 1, to sense the input and output voltages of DC-to-DC conditioner 402.

Figure 5:
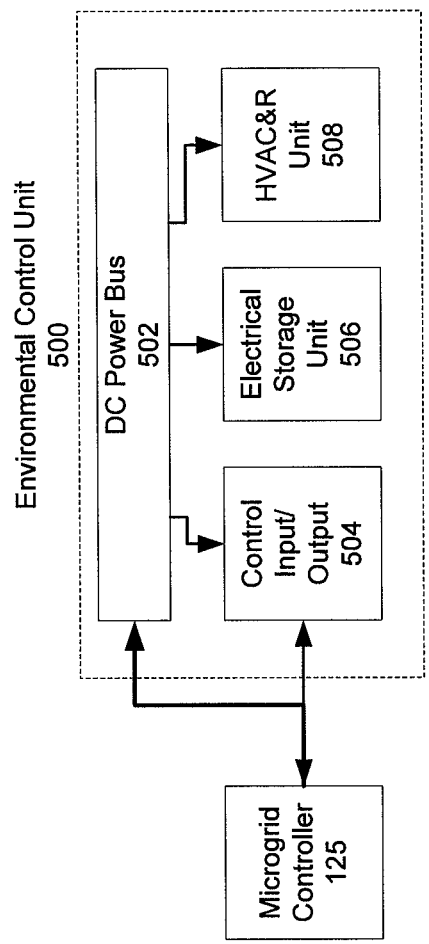
FIG. 5 is a schematic diagram illustrating an embodiment of an ECU electrically connected to a microgrid controller.

FIG. 5 shows an embodiment of an ECU 500 electrically connected to the microgrid controller 125. The microgrid controller 125 is electrically connected to a DC power bus 502 of the ECU 500 and directs power to the ECU 500 via that connection. The ECU 500 may use electricity from microgrid controller 125 to power its HVAC&R unit and to charge an integrated electrical storage unit 506. Microgrid controller 125 also sends electrical command signals to ECU 500 by way of control input/output 504. ECU 500 receives electrical command signals from microgrid controller 125 and operates its electrical storage unit 506 and HVAC&R unit 508 accordingly. In alternative embodiments, microgrid controller 125 may also receive power from the electrical storage unit 506 and use that power to service other loads connected to the microgrid.

Figure 6:
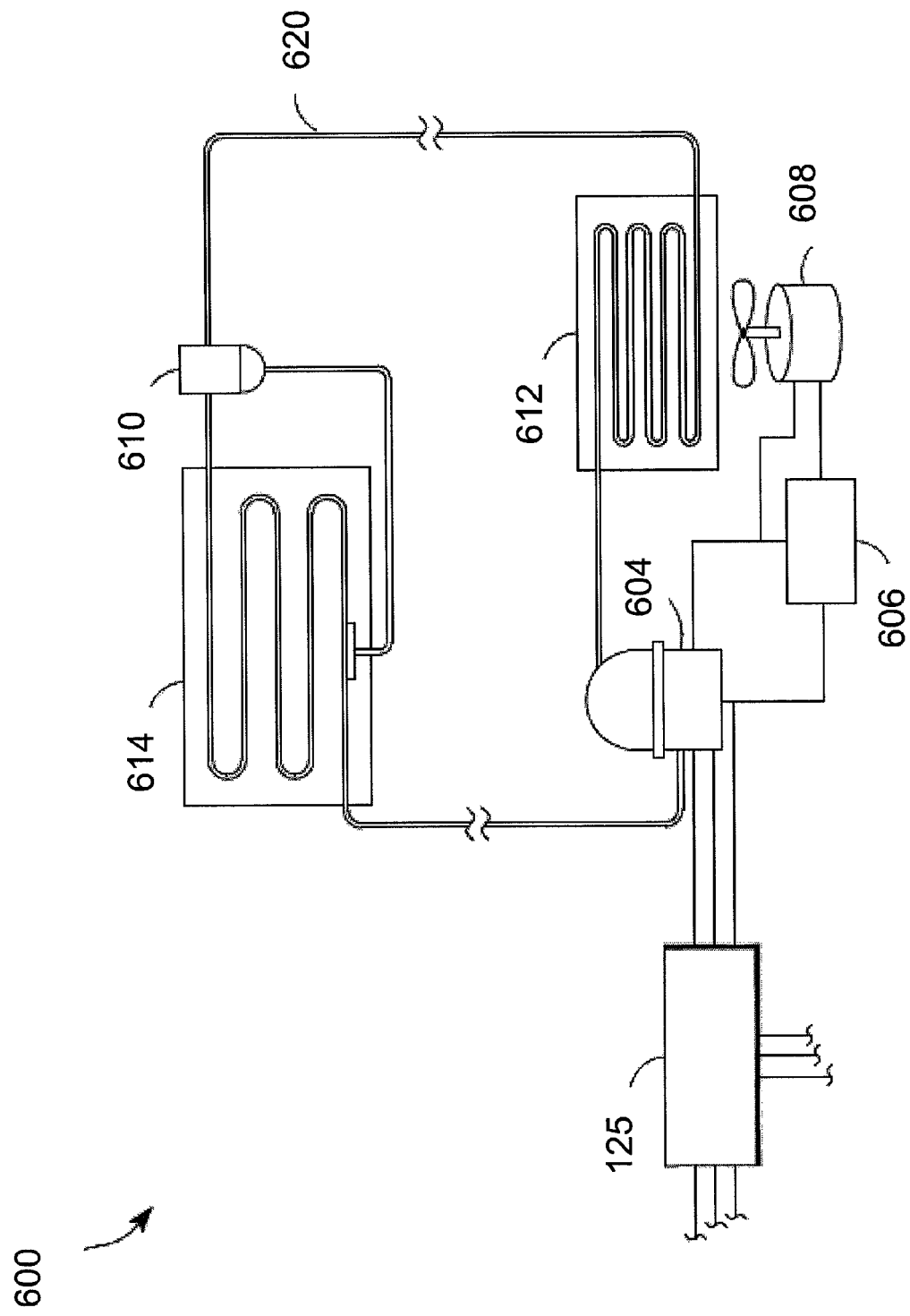
FIG. 6 is a schematic illustration of elements of an HVAC/R system, including a pulsed control valve.

FIG. 6 is a schematic illustration of elements of an HVAC&R system 600, including a pulsed control valve 610. HVAC&R system 600 could be, for example, the HVAC&R unit 508 of FIG. 5. Refrigerant is circulated in the system via the refrigerant lines 620. The compressor motor 604 compresses refrigerant circulated in the refrigerant lines 620 and then passes it to condenser 612, where the compressed refrigerant is cooled and liquefied. Condenser fan 608 assists with the cooling of the compressed refrigerant by forcing air over cooling fins (not shown) attached to condenser 612. Compressor motor 604 is electrically connected to microgrid controller 125, which provides three-phase AC power to it. Microgrid controller 125 is additionally electrically connected to phase change module 606, which converts three-phase AC power to single-phase AC power for condenser fan 608. Collectively, compressor motor 604, condenser 612, condenser fan 608 and phase change module 606 make up a condenser unit. After the refrigerant is cooled and condensed in the condenser unit 612, it is passed to a pulsed control valve 610. Pulsed control valve 610 controls refrigerant flow from condenser 612 to evaporator 614. Conventional evaporators are designed to operate at full refrigerant flow and are inefficient at lower flows, and fluctuating flows. However, microgrid-controlled compressor motor 604 may result in variable refrigerant flows to condenser 612 and evaporator 614 as the compressor speed is modulated according to cooling needs. In order to achieve optimal system performance, pulsed control valve 610 is used to produce an optimal refrigerant flow regardless of the speed of compressor motor 604. Such refrigerant control is especially important at lower refrigerant flow rates resulting from variable compressor speeds. The pulsed control valve 610 may be a mechanical valve such as described in U.S. Pat. Nos. 5,675,982 and 6,843,064 or an electrically operated valve of the type described in U.S. Pat. No. 5,718,125, the descriptions of which are incorporated herein by reference in their entireties. Evaporator 614 evaporates the compressed refrigerant thereby extracting heat from the air around it. Evaporator 614 may additionally have metal fins (not shown) to increase its heat exchanging efficiency.

Figure 7:
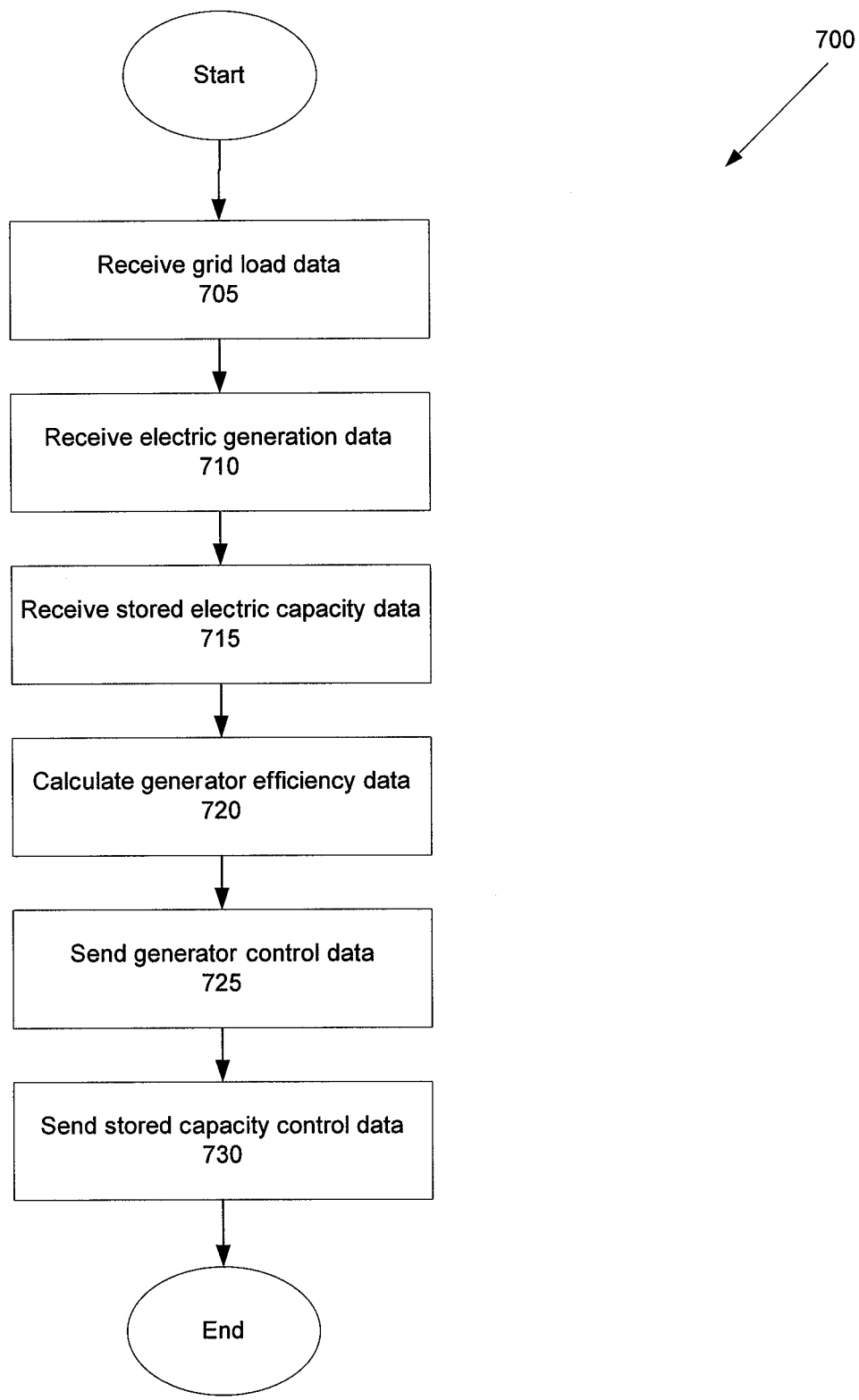
FIG. 7 is a process flow diagram illustrating a method of operating a microgrid using a microgrid controller.

FIG. 7 is a process flow diagram illustrating a method of operating a microgrid using a microgrid controller. The process starts at state 705 where a microgrid controller, such as microgrid controller 125 of FIG. 1, receives grid load data. Grid load data may include data from inductive loads, resistive loads and other loads connected to the microgrid controller. For example, loads may include local load data generators such as voltage and current meters. Or loads may be measured by measuring voltages and currents and other electric parameters at each of the electric outputs of the microgrid controller, such as outputs 144, 146 and 150 of FIG. 1. As yet another alternative, grid load data may be the current voltage of the grid, which indicates the changing load on the grid as it increases or decreases from a target voltage. The grid load data may be received at a control module, such as control module 138 of FIG. 1 so that the data may be used within the control logic of the control module. Thus, at state 705 the microgrid controller receives and evaluates the current total load on the microgrid. Note that the microgrid controller may additionally evaluate different loads according to different load parameters, such as critical and non-critical loads, or resistive and inductive loads. Thus, the microgrid controller may include logic to categorize different types of loads to increase the granularity of control of connected microgrid assets.

The process then moves to state 710, where the microgrid controller receives electric generation data from all connected power generation units (e.g. units 102-108 of FIG. 1). For example, in one embodiment, the microgrid controller may be electrically connected to a set of diesel generators, which may have the same or different electric output capacities. As such, the microgrid controller may receive generation data from each connected diesel generator, such as operating speed (e.g. RPM), current electric output (e.g. watts), current electric frequency (e.g. 60 hertz), current electric voltage (e.g. 480 volts), operating temperature, fuel level, battery charge, fault data, and other data as is appropriate for monitoring the performance of each connected generator. Notably, in other embodiments with, for example, wind generators, the received electric generation data may include additional parameters such as wind speed, wind direction, rotor speed, and others in addition to the aforementioned parameters. In embodiments including solar generators, the received electric generation data may include photosensor data, panel temperature data, panel angle data and others in addition to the aforementioned parameters. In embodiments with fuel cell generators, the received electric generation data may include fuel cell temperature data, catalyst data, and others in addition to the aforementioned parameters. The electric generation data may be received at a control module, such as control module 138 of FIG. 1. With all of the received electric generation data, the microgrid controller is able to calculate a comprehensive set of data regarding the current electric generation capacity of the microgrid system.

The process then moves to state 715 where the microgrid controller receives stored electric capacity data from, for example, an electrical storage unit such as electrical storage unit 156 of FIG. 1. In one embodiment, the electrical storage unit includes one or more DC back-up batteries connected to the microgrid controller. The stored electric capacity data may include parameters such as battery temperature, battery terminal voltage, battery capacity, battery cycle count, battery charge voltage, fault information, and other parameters as necessary. The stored electric capacity data may be received at a control module, such as control module 138 of FIG. 1. With the stored capacity data, the microgrid controller may calculate the amount of stored capacity that may be directed to loads connected to the microgrid controller in the event that generation capacity falls below current microgrid load, or in the event of a fault such as a generator failure. Likewise, the microgrid controller may evaluate stored electric capacity to decide when to divert additional generation capacity to be stored in the connected electrical storage unit.

The process then moves to state 720 where the microgrid controller calculates generator efficiency data for the power generation units connected to the microgrid controller. For example, as discussed previously, diesel generators have varying output capacity at different generator speeds and corresponding varying efficiencies. Likewise wind generators may be most efficiency at certain turbine speeds; fuel cell generators may be most efficiency at certain electric outputs; etc. These parameters may be programmed into the microgrid controller so that the microgrid controller can calculate optimal power generation unit operational parameters (e.g. speed) or may be calculated based on sensor feedback.

For example, the microgrid controller may be programmed with efficiency data such as a range of diesel generator RPMs and corresponding power output and fuel usage for each RPM based on, for example, manufacturer specifications or guidelines. Alternatively, the microgrid controller may actively calculate diesel generator efficiency data my monitoring, for example, mass fuel flow to the generator and associating the fuel usage with generator speed and electric output. Using the latter method, the microgrid controller may calculate dynamic diesel generator efficiency data based on changing conditions. Further, the microgrid controller may proactively monitor for faults (e.g. clogged air-intake) by monitoring for deviations in diesel generator efficiency data. This is particularly important where the microgrid controller is connected to more than one diesel generator. The microgrid controller may additionally compare current diesel generator efficiency data to a target efficiency data stored within memory of the microgrid controller. Notably, the efficiency of other types of generators like solar, fuel-cell and wind generators and others may also be calculated using relevant parameters.

The process then moves to state 725 where the microgrid controller sends generator control data to connected power generation units. For example, the microgrid controller may calculate the current efficiency of one or more connected diesel generators and compare that to a target efficiency for each generator or for the system as a whole. The microgrid controller may then instruct the diesel generators to speed up or slow down to achieve a higher overall generator efficiency.

For example, a microgrid controller may be connected to two diesel generators. At an initial time, one generator may be running at or near its ideal efficiency and adequately servicing loads on the microgrid while the other generator is idle. When the load on the microgrid increases, the first generator may speeds up to create more electric output to cover the increased load; however, in doing so, the first generator moves away from its optimal efficiency range. As load on the microgrid continues to increase, a second generator may be brought online to handle the additional electric load. In a system without a microgrid controller, the additional generator may be brought online to handle the additional load, but at a very low engine speed if the load margin over the first generator's capacity is low. This results in one generator operating at an engine speed above its optimal efficiency range and one operating at an engine speed below its optimal efficiency range. Thus, while the loads are being serviced, the overall system efficiency is diminished. With the addition of a microgrid controller, the first generator speed may be reduced and the second generator speed may be increased so that each runs more efficiently (for example, in terms of fuel used per watt produced).

As another example, both diesel generators may be running while the load on the microgrid continues to decrease. In a system without a microgrid controller, each generator may continue to slow down its operating speed to reduce its output as the load continues to decrease; however, in doing so, each generator may fall below its optimal efficiency range. In a system with a microgrid controller, the microgrid controller may instruct one generator to turn off while the other is sped back up into its optimal efficiency range to service the loads on the microgrid. Thus, while the power generation equipment is the same (namely the two generators) and the output is the same (e.g. some wattage), the efficiency of the microgrid system with a microgrid controller may be increased.

Notably, at state 725 the microgrid controller may send generator control data to other power generation units such as solar generators, fuel cell generators, wind generators and others using similar logic. For example, in a microgrid system with a diesel generator and a solar generator, the single diesel generator may be servicing all loads during nighttime hours when there is no sun available. As such, the generator may be operating above its optimal efficiency range. As the sun comes up, the solar generator may come online and accordingly the microgrid controller may instruct the diesel generator to slow down to increase its efficiency, or even to turn off if the solar output capacity exceeds the current load on the microgrid. As more generator types are added to the microgrid system, the generator control data may be calculated, for example, by a multivariate cost function where each generator has a cost and where the function is minimized for a certain electric output. Other means of generating optimal generator control data may also be used based on static or dynamic calculations.

The process then moves to state 730 where the microgrid controller sends stored capacity control data to electrical storage units connected to the microgrid, such as electrical storage unit 156 of FIG. 1. Stored capacity control data may be, for example, instructions to release stored capacity onto the microgrid to service loads, or to store excess generation capacity to the electrical storage unit.

For example, a microgrid may have a single diesel generator and an electrical storage unit. As discussed previously, the generator may have an optimal efficiency range i.e. a range of operating speeds whereby output is maximized relative to fuel use. While the load on the microgrid is dynamic, it may be preferable to run the generator at a more or less constant speed to maximize its efficiency. Accordingly, a microgrid controller may direct excess electric generation to the electrical storage unit (e.g. a battery) when load on the grid is less than current generator output, or the microgrid controller may direct stored capacity onto the microgrid when electric load exceeds current generator output. In this way, the microgrid controller is able to maintain the generator in its optimal efficiency range while servicing dynamic loads on the microgrid.

The process concludes at state 730; however, the process may be run iteratively (e.g. once every set amount of time) or constantly depending on system user preferences. For example, the system may constantly run through states 705-730 to constantly attempt to maximize the efficiency of the microgrid system as a whole. Alternatively, the microgrid controller may be programmed with hysteresis rules such that the system is only altered once it falls out of a range of calculated efficiency. In any event, the microgrid controller actively senses the operating parameters and needs of the microgrid and directs generation and storage capacity assets to service those needs in an effort to maximize microgrid system efficiency.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

Many of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

While the above detailed description has shown, described, and pointed out novel features as applied to various embodiments, it will be understood that various omissions, substitutions, and changes in the form and details of the devices and processes illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A system for increasing efficiency of power generation, distribution and delivery, comprising:
    a microgrid controller having a plurality of inputs and a plurality of outputs comprising one or more variable frequency outputs, wherein the plurality of outputs are configured to connect to a plurality of electrical loads;
    a plurality of power generation units electrically connected to the plurality of inputs on the microgrid controller, the plurality of power generation units having an optimal efficiency range;
    an electrical storage unit electrically connected to a second input on the microgrid controller; and
    an electrical load electrically connected to an output of the microgrid controller;
    wherein the microgrid controller comprises a control module connected to the plurality of power generation units and configured to operate the plurality of power generation units at or near the optimal efficiency range regardless of variations in electrical load by:
       transferring power to the electrical storage unit when electrical load on an output is below a threshold; and
       transferring power from the electrical storage unit when electrical load on an output is above the threshold in order to maintain the plurality of power generation units at or near the optimal efficiency range.

2. The microgrid system of claim 1, wherein the microgrid controller comprises a variable frequency output connected to the electrical load.

3. The microgrid system of claim 2, wherein the variable frequency output comprises an insulated gate bipolar transistor (IGBT).

4. The microgrid system of claim 2, wherein the variable frequency output comprises a variable frequency drive (VFD).

5. The microgrid system of claim 1, wherein an electrical load comprises electric lights within an enclosure.

6. The microgrid system of claim 5, wherein an electrical load comprises an HVAC&R system configured to condition air in the enclosure.

7. The microgrid system of claim 5, wherein an electrical load comprises an Environmental Control Unit (ECU) configured to condition air in the enclosure.

8. The microgrid system of claim 1, wherein the plurality of power generation units include at least one a diesel generator.

9. The microgrid system of claim 1, wherein at least one of the plurality of power generation units is selected from the group consisting of a solar generator, a wind generator, and a fuel cell generator.

10. The microgrid system of claim 1, wherein the electrical storage unit is one or more batteries.

11. A microgrid controller, comprising:
a plurality of inputs configured to electrically connect to a plurality of power generation units, the plurality of power generation units each having an optimal efficiency range;
a plurality of outputs configured to electrically connect to a plurality of electrical loads, wherein the plurality of outputs comprises one or more variable frequency outputs; and
a control module comprising instructions to control the plurality of power generation units and operate the plurality of power generation units at or near the optimal efficiency range regardless of variations in electrical load by:
transferring power to an electrical storage unit when electrical load on an output is below a threshold; and
transferring power from the electrical storage unit when electrical load on an output is above the threshold in order to maintain the plurality of power generation units at or near their optimal efficiency range.

12. The microgrid controller of claim 11, wherein the control module comprises instructions to control the speed of one or more of the plurality of power generation units to increase their overall energy output efficiency.

13. The microgrid controller of claim 11, wherein the control module comprises instructions to control the number of operating power generation units to increase the overall energy output efficiency of the plurality of power generation units.

14. The microgrid controller of claim 11, wherein the power generation units are diesel generators, and the control module is programmed to control the speed of the diesel generators to increase the overall energy output efficiency of the diesel generators.

15. The microgrid controller of claim 11, wherein the one or more variable frequency outputs comprise one or more insulated gate bipolar transistors (IGBTs).

16. A method in a microgrid controller for allocating power to electric loads connected to a microgrid, the method comprising:
receiving grid load data from at least one load electrically connected to the microgrid controller;
receiving electric generation data from a plurality of power generation units electrically connected to the microgrid controller, wherein the plurality of power generation units have an optimal efficiency range and are electrically connected to the at least one load via a variable frequency output;
calculating generator efficiency data for the plurality of power generation units electrically connected to the microgrid controller; and
sending generator control data to the plurality of power generation units electrically connected to the microgrid controller to operate the plurality of power generation units at or near the optimal efficiency range regardless of variations in electrical load by:
transferring power to an electrical storage unit when electrical load on the output is below a threshold; and
transferring power from the electrical storage unit when electrical load on the output is above the threshold in order to maintain the plurality of power generation units at or near their optimal efficiency range.

17. The method of claim 16 additionally comprising:
receiving stored electric capacity data from at least one electrical storage unit electrically connected to the microgrid controller; and
sending stored capacity control data to the at least one electrical storage unit electrically connected to the microgrid controller.

18. The method of claim 17, wherein the electrical storage unit is at least one direct current (DC) battery.

19. The method of claim 16, wherein receiving grid load data comprises measuring the voltage of the microgrid.

* * * * *